US012631446B2

(12) United States Patent
Golani et al.

(10) Patent No.: US 12,631,446 B2
(45) Date of Patent: May 19, 2026

(54) LANE EDGE DETECTION IN AN ELECTRODE SHEET OF A BATTERY

(71) Applicant: HONEYWELL INTERNATIONAL INC., Charlotte, NC (US)

(72) Inventors: Sunil Golani, Bangalore (IN); Niranjan Amrutur Subba Rao, Bangalore (IN); Murali D, Bangalore (IN); LingaThurai Palanisamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 356 days.

(21) Appl. No.: 18/371,487

(22) Filed: Sep. 22, 2023

(65) Prior Publication Data

US 2025/0102297 A1    Mar. 27, 2025

(51) Int. Cl.
*G01B 21/08* (2006.01)
*H01M 4/04* (2006.01)

(52) U.S. Cl.
CPC .......... *G01B 21/08* (2013.01); *H01M 4/0404* (2013.01)

(58) Field of Classification Search
CPC ..................................................... G01B 21/08
See application file for complete search history.

(56) References Cited

U.S. PATENT DOCUMENTS

2011/0273557 A1 * 11/2011 Ichizawa .............. G01B 11/028
                                                          348/88
2020/0096308 A1 * 3/2020 Hughes .................... G01B 7/06

FOREIGN PATENT DOCUMENTS

JP      2014049316    *  3/2021
KR      20210026296   *  3/2021

* cited by examiner

*Primary Examiner* — John E Breene
*Assistant Examiner* — Alex T Devitc

(57) ABSTRACT

Techniques for lane edge detection on an electrode sheet of a battery are described. In one aspect, scan data corresponding to a coating thickness of a plurality of bins distributed into a number of rows and columns across the electrode sheet is obtained. A first average coating thickness is computed for each column of the electrode sheet based on a number of bins identified in the column, based on which, a second average coating thickness is calculated for a first set of columns of the electrode sheet. A difference between the second average coating thickness and a standard deviation value is identified to compute an average minimum edge coating thickness, which is then compared with the first average coating thickness for each column to detect an edge transition of coated to uncoated region of the electrode sheet. Accordingly, a lane edge is determined for the column.

20 Claims, 7 Drawing Sheets

500

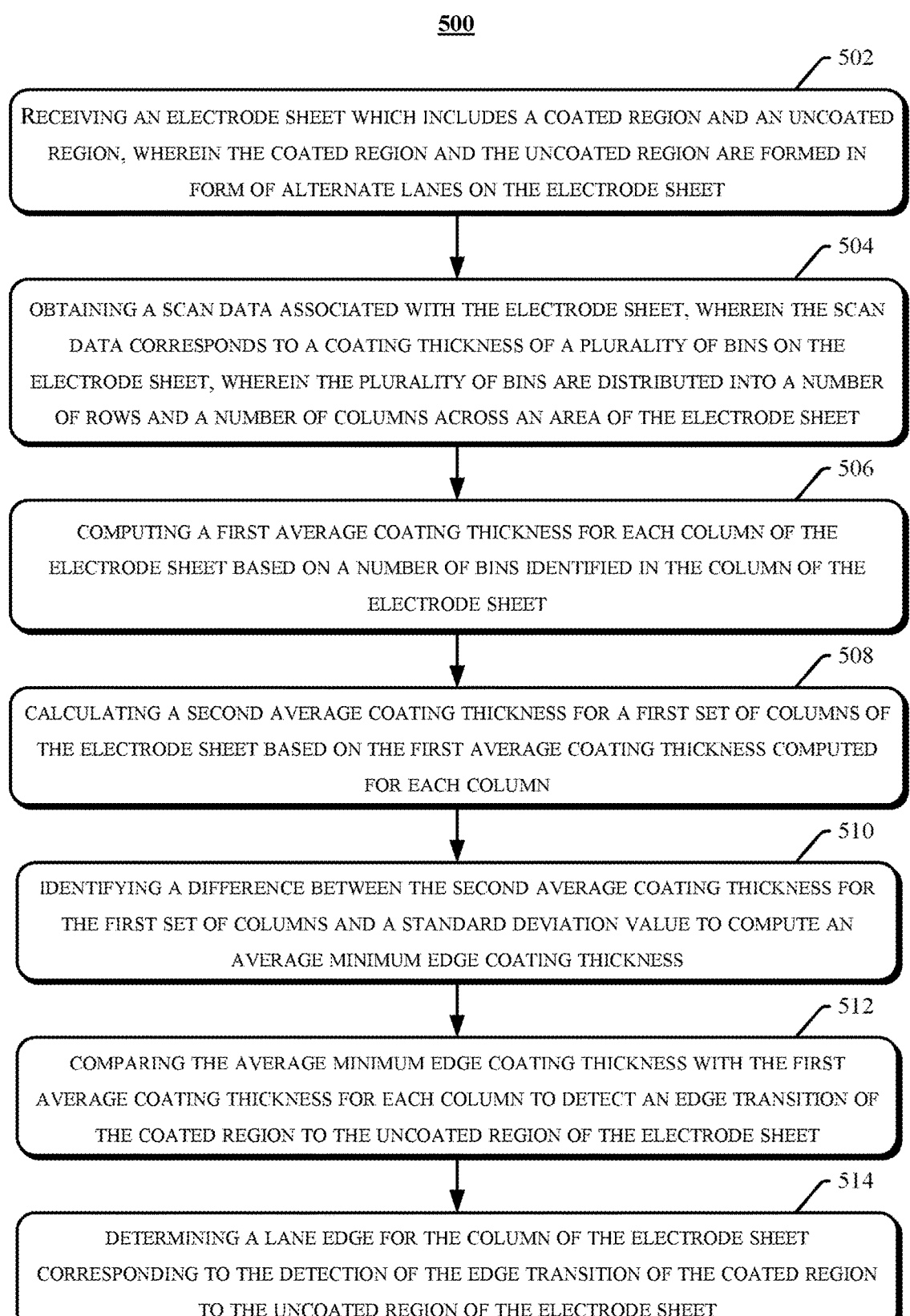

RECEIVING AN ELECTRODE SHEET WHICH INCLUDES A COATED REGION AND AN UNCOATED REGION, WHEREIN THE COATED REGION AND THE UNCOATED REGION ARE FORMED IN FORM OF ALTERNATE LANES ON THE ELECTRODE SHEET — 502

OBTAINING A SCAN DATA ASSOCIATED WITH THE ELECTRODE SHEET, WHEREIN THE SCAN DATA CORRESPONDS TO A COATING THICKNESS OF A PLURALITY OF BINS ON THE ELECTRODE SHEET, WHEREIN THE PLURALITY OF BINS ARE DISTRIBUTED INTO A NUMBER OF ROWS AND A NUMBER OF COLUMNS ACROSS AN AREA OF THE ELECTRODE SHEET — 504

COMPUTING A FIRST AVERAGE COATING THICKNESS FOR EACH COLUMN OF THE ELECTRODE SHEET BASED ON A NUMBER OF BINS IDENTIFIED IN THE COLUMN OF THE ELECTRODE SHEET — 506

CALCULATING A SECOND AVERAGE COATING THICKNESS FOR A FIRST SET OF COLUMNS OF THE ELECTRODE SHEET BASED ON THE FIRST AVERAGE COATING THICKNESS COMPUTED FOR EACH COLUMN — 508

IDENTIFYING A DIFFERENCE BETWEEN THE SECOND AVERAGE COATING THICKNESS FOR THE FIRST SET OF COLUMNS AND A STANDARD DEVIATION VALUE TO COMPUTE AN AVERAGE MINIMUM EDGE COATING THICKNESS — 510

COMPARING THE AVERAGE MINIMUM EDGE COATING THICKNESS WITH THE FIRST AVERAGE COATING THICKNESS FOR EACH COLUMN TO DETECT AN EDGE TRANSITION OF THE COATED REGION TO THE UNCOATED REGION OF THE ELECTRODE SHEET — 512

DETERMINING A LANE EDGE FOR THE COLUMN OF THE ELECTRODE SHEET CORRESPONDING TO THE DETECTION OF THE EDGE TRANSITION OF THE COATED REGION TO THE UNCOATED REGION OF THE ELECTRODE SHEET — 514

Fig. 5

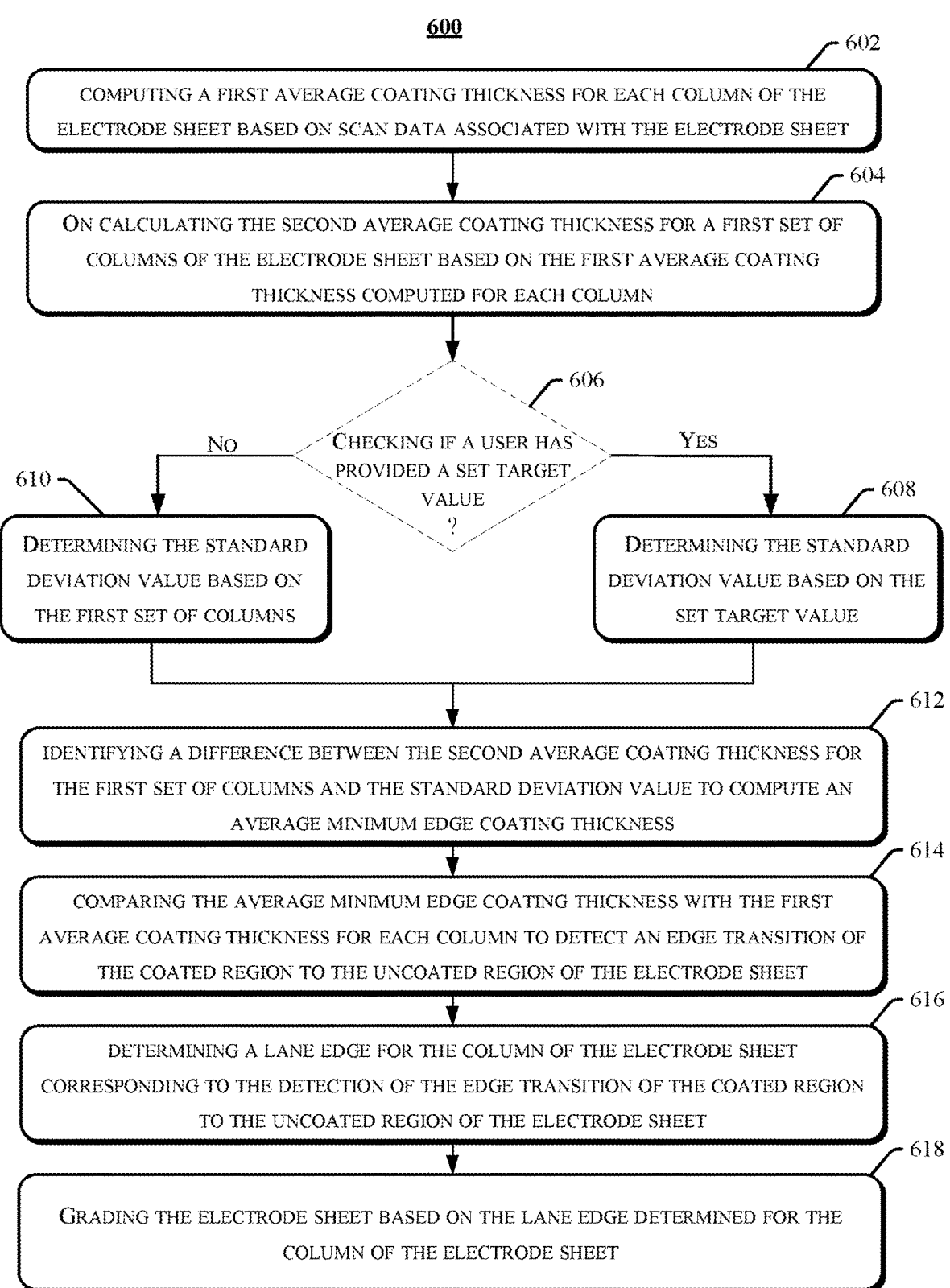

600

602
COMPUTING A FIRST AVERAGE COATING THICKNESS FOR EACH COLUMN OF THE ELECTRODE SHEET BASED ON SCAN DATA ASSOCIATED WITH THE ELECTRODE SHEET

604
ON CALCULATING THE SECOND AVERAGE COATING THICKNESS FOR A FIRST SET OF COLUMNS OF THE ELECTRODE SHEET BASED ON THE FIRST AVERAGE COATING THICKNESS COMPUTED FOR EACH COLUMN

606
CHECKING IF A USER HAS PROVIDED A SET TARGET VALUE ?

NO

YES

610
DETERMINING THE STANDARD DEVIATION VALUE BASED ON THE FIRST SET OF COLUMNS

608
DETERMINING THE STANDARD DEVIATION VALUE BASED ON THE SET TARGET VALUE

612
IDENTIFYING A DIFFERENCE BETWEEN THE SECOND AVERAGE COATING THICKNESS FOR THE FIRST SET OF COLUMNS AND THE STANDARD DEVIATION VALUE TO COMPUTE AN AVERAGE MINIMUM EDGE COATING THICKNESS

614
COMPARING THE AVERAGE MINIMUM EDGE COATING THICKNESS WITH THE FIRST AVERAGE COATING THICKNESS FOR EACH COLUMN TO DETECT AN EDGE TRANSITION OF THE COATED REGION TO THE UNCOATED REGION OF THE ELECTRODE SHEET

616
DETERMINING A LANE EDGE FOR THE COLUMN OF THE ELECTRODE SHEET CORRESPONDING TO THE DETECTION OF THE EDGE TRANSITION OF THE COATED REGION TO THE UNCOATED REGION OF THE ELECTRODE SHEET

618
GRADING THE ELECTRODE SHEET BASED ON THE LANE EDGE DETERMINED FOR THE COLUMN OF THE ELECTRODE SHEET

Fig. 6

LANE EDGE DETECTION IN AN ELECTRODE SHEET OF A BATTERY

TECHNICAL FIELD

The present subject matter relates, in general, to lane edge detection in an electrode sheet of a battery, and in particular, to lane edge detection in an electrode sheet of a Lithium-ion battery.

BACKGROUND

A sheet type electrode is typically utilized in a Lithium-Ion Battery. Lithium-Ion batteries are predominantly used in consumer electronics, electric vehicles, and the like. The sheet type electrode, which may either be a cathode or an anode, is formed by depositing an electrode material on a metal sheet, foil, film, or the like. The electrode material is deposited, generally in the form of lanes on the sheet, to form a coated region. The coated region of the electrode sheet determines the charge holding capacity of the battery, while the uncoated regions on the electrode sheet are utilized for connecting with terminals of the battery. The coated regions and the uncoated regions may be formed in alternating lanes of the electrode sheet.

SUMMARY

Aspects of the present subject matter provide techniques to facilitate lane edge detection on an electrode sheet of the battery to ensure the highest quality of a battery.

According to an example of the present subject matter, a method for lane edge detection on an electrode sheet of a battery is provided. The method includes receiving the electrode sheet having a coated region and an uncoated region, where the coated region and the uncoated region are formed in form of alternate lanes on the electrode sheet. The coated region includes a deposition of a coating material. Further, a scan data associated with the electrode sheet is obtained, where the scan data corresponds to a coating thickness of a plurality of bins on the electrode sheet. Each bin from amongst the plurality of bins corresponds to a resolution area scanned by a scanning mechanism while scanning the electrode sheet. The plurality of bins are distributed into a number of rows and a number of columns across an area of the electrode sheet. A first average coating thickness is computed for each column of the electrode sheet based on a number of bins identified in the column of the electrode sheet. Further, a second average coating thickness is calculated for a first set of columns of the electrode sheet based on the first average coating thickness computed for each column. A difference between the second average coating thickness for the first set of columns and a standard deviation value is identified to compute an average minimum edge coating thickness. Further, the average minimum edge coating thickness is compared with the first average coating thickness for each column to detect an edge transition of the coated region to the uncoated region of the electrode sheet. Accordingly, a lane edge is determined for the column of the electrode sheet corresponding to the edge transition of the coated region to the uncoated region of the electrode sheet.

According to another example of the present subject matter, a system for lane edge detection on an electrode sheet of a battery is provided. The system includes a processor and a machine-readable storage medium comprising instructions executable by the processor, where the process causes a scanner to receive the electrode sheet which includes a coated region and an uncoated region. The coated region and the uncoated region are formed in the form of alternate lanes on the electrode sheet, where the coated region includes a deposition of a coating material. Accordingly, the scanner is to scan the electrode sheet to record a scan data associated with the electrode sheet. The scan data corresponds to a coating thickness of a plurality of bins on the electrode sheet, where each bin from amongst the plurality of bins corresponds to a resolution area scanned by the scanner. The plurality of bins are distributed into a number of rows and a number of columns across an area of the electrode sheet. Further, the processor causes an analyzing module to compute a first average coating thickness for each column of the electrode sheet based on a number of bins identified in the column of the electrode sheet, calculate a second average coating thickness for a first set of columns of the electrode sheet based on the first average coating thickness computed for each column, and identify a difference between the second average coating thickness for the first set of columns and a standard deviation value to compute an average minimum edge coating thickness. The processor further causes an edge detection module to compare the average minimum edge coating thickness with the first average coating thickness for each column to detect an edge transition of the coated region to the uncoated region of the electrode sheet. Corresponding to the edge transition of the coated region to the uncoated region of the electrode sheet, a lane edge for the column of the electrode sheet is determined.

According to another example of the present subject matter, a non-transitory computer readable medium containing program instruction is provided, that, when executed, causes the processor to obtain a scan data associated with the electrode sheet, where the scan data corresponds to coating thickness of a plurality of bins on the electrode sheet, where each bin from amongst the plurality of bins corresponds to a resolution area scanned, and where the plurality of bins are distributed into a number of rows and a number of columns across an area of the electrode sheet, compute a first average coating thickness for each column of the electrode sheet based on a number of bins identified in the column of the electrode sheet, calculate a second average coating thickness for a first set of columns of the electrode sheet, where the first set of columns of the electrode sheet are selected based on the first average coating thickness computed for each column, identify a difference between the second average coating thickness for the first set of columns and a standard deviation value to compute an average minimum edge coating thickness, compare the average minimum edge coating thickness with the first average coating thickness for each column to detect an edge transition of a coated region to an uncoated region of the electrode sheet, where the coated region and the uncoated region are formed in form of alternate lanes on the electrode sheet, wherein the coated region comprises a deposition of a coating material, and determine a lane edge for the column of the electrode sheet corresponding to the edge transition of the coated region to the uncoated region of the electrode sheet.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 5 illustrates an example method for lane edge detection on an electrode sheet of a battery, in accordance with an example implementation of the present subject matter.

FIG. 6 illustrates another example method for lane edge detection on an electrode sheet of a battery, in accordance with an example implementation of the present subject matter.

DETAILED DESCRIPTION

Figure 1:
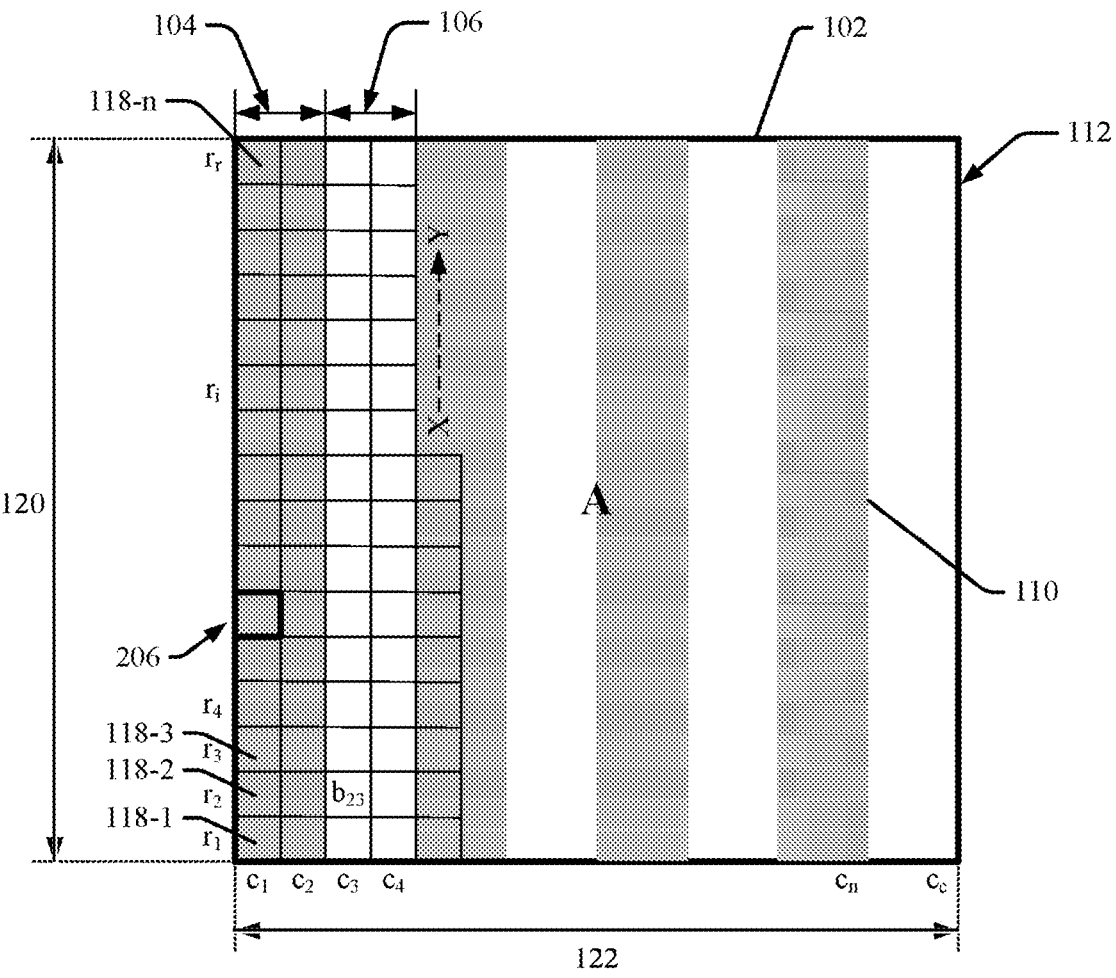
FIG. 1 illustrates an example electrode sheet, in accordance with an example implementation of the present subject matter.

The present subject matter relates to techniques of lane edge detection on an electrode sheet of a battery. Typically, in Lithium Ion Battery (LIB) manufacturing process, quality of the battery is predominantly based on the quality of electrode sheets, amongst other factors. The electrode sheet may be an anode or a cathode which is formed by depositing an electrode material on a metal sheet, for example, an aluminum sheet, a metallic foil, a film, or the like. The electrode material is typically in the form of a slurry mixture which is deposited on the metal sheet to form lanes of the electrode material on the metal sheet. The slurry mixture may be deposited on the electrode sheet in a way such that the electrode sheet has a coated lane followed by an uncoated lane, alternatively. It would be noted that the coated region of the electrode sheet generally contributes to the charge holding capacity of the battery.

In the Li-ion battery manufacturing process, assessing the quality of the coated regions is important to determine the quality of the battery. Various parameters associated with the coating deposition, such as, thickness of the coating, width of the coating deposited for a lane, whether the coating deposited on the upper surface of the electrode sheet coincides with the coating deposited on the lower surface of the electrode sheet, and the like, are considered to qualitatively analyze and grade the electrode sheet.

Traditional scanning techniques for assessment of electrode sheets, such as image scanning makes use of cameras for scanning and are utilized to detect an edge of the lane to distinguish the coated regions from the uncoated regions on the electrode sheets. These techniques provide information regarding the area of the coated region and the area of the uncoated region based on which an edge of the lane formed by the coated region, or the uncoated region is determined. Since the process of coating deposition is a physical process, while depositing the coating material at high speeds in large scales, there are instances where the coated region is formed with irregular edges. Many of such irregularities are not captured through the known scanning techniques and goes unnoticed during assessment. This may result in inaccurate detection of edges, thereby leading to inferior quality assessments of the batteries. Such inferior quality assessments therefore result in production of substandard and unsafe batteries. In another example, there may be a very small defect on the electrode sheet which may be in close proximity to the edge of the coated region, for example, a pinhole formed in close proximity to the edge of the coated region on the electrode sheet. Identifying the location of this defect may become important to assess the quality or useability of that particular electrode sheet. Based on the traditional scanning techniques it may be observed that the pinhole lies on the edge detected, as discussed above, and the electrode sheet may be discarded. However, there is a possibility that the pinhole actually lies in a portion of the edge which is irregular and may lie just after the actual edge of the coated region. This may go unnoticed, and the electrode sheet may be discarded due to misidentification of the pinhole being formed in the coated region of the electrode sheet. Therefore, detecting an actual edge of the lane formed on the electrode sheet is important to assess the quality or grade the electrode sheet for an appropriate application.

According to examples of the present subject matter, techniques for lane edge detection in an electrode sheet of a battery are described. In one example, a method for lane edge detection on an electrode sheet of a battery is provided. In this example, an electrode sheet which includes a coated region, and an uncoated region is received. The coated region and the uncoated region are formed in the form of alternate lanes on the electrode sheet, where the coated regions on the electrode sheet are formed by deposition of a coating material.

On receiving the electrode sheet, the electrode sheet may be further subjected to a scanning mechanism, where the electrode sheet is scanned from one corner to another. A scan data associated with the scanned electrode sheet is then obtained, where the scan data corresponds to, amongst other information, a coating thickness of a point on the electrode sheet. Each point of the electrode sheet may correspond to a bin on the electrode sheet, where the bin corresponds to a resolution area scanned by the scanning mechanism. In one example, the electrode sheet may be virtually divided into multiple bins and the coating thickness information is obtained for the multiple bins on the electrode sheet. In an example of the present subject matter, the bins may be distributed into a number of rows and a number of columns across an area of the electrode sheet. For example, if the resolution area of the scanning mechanism is 1 cm and if an electrode sheet having an area of 60 $cm^2$ is considered, the entire electrode sheet may be analyzed by scanning 60 different bins of 1 cm×1 cm each. These 60 bins may be arranged in the form of rows and columns, where there could be 6 rows and 10 columns, or 10 rows and 6 columns. On considering the example where the bins of the electrode sheet are distributed across 6 rows and 10 columns, each column would include 6 bins. Further, since the coated regions and uncoated regions of the electrode sheet are in the form of alternate lanes, a few of the columns on the electrode sheet would be coated, and a few of the columns would be uncoated. In the current example, out of the 10 columns on the electrode sheet, 6 columns may be coated, and 4 columns may be uncoated. In one example, the columns 1, 2, and 3, may be coated forming a first lane of the coated region on the electrode sheet followed by two uncoated columns 4 and 5, forming a first lane of the uncoated region on the electrode sheet. Similarly, the subsequent columns 6, 7, and 8, may be coated forming a second lane of the coated region on the electrode sheet followed by two uncoated columns 9 and 10, forming a second lane of the uncoated region on the electrode sheet.

In an example implementation of the present subject matter, for lane edge detection on the electrode sheet, a first average coating thickness for each column of the electrode sheet is computed. The first average coating thickness for each column is computed based on a number of bins identified in each column of the electrode sheet. Once the first average coating thickness for each column is computed, the first average coating thickness for each column of the electrode sheet may be sorted based on the first average coating thickness to obtain a sorted first average coating thickness for each column. The sorting may be performed to identify a first set of columns with accurate coating levels. The first set of columns are then selected from the sorted first average coating thickness for each column for further computations.

On selecting the first set of columns, a second average coating thickness for the first set of columns of the electrode sheet is calculated. Further, a difference between the second average coating thickness for the first set of columns and a standard deviation value is identified to compute an average minimum edge coating thickness.

On comparing the average minimum edge coating thickness with the first average coating thickness for each column, an edge transition of the coated region to the uncoated region of the electrode sheet may be detected. For example, when the average minimum edge coating thickness is greater than or equal to the first average coating thickness for each column, the edge transition from the coated region to an uncoated region may be detected. Further, a lane edge for the column of the electrode sheet may be determined corresponding to the detection of the edge transition of the coated region to the uncoated region of the electrode sheet. In one example, the lane edge determined may be translated into a physical width of the column on the electrode sheet.

Further, on determining the lane edge for the column on the electrode sheet, the electrode sheet may be analyzed to assess a grade of the electrode sheet. In one example, the electrode sheet may be graded acceptable or unacceptable. An electrode sheet graded as acceptable may be further graded as grade I electrode sheet and grade II electrode sheet. In one example, grading of the electrode sheet may be associated with an amount of coating material that is deposited beyond the lane edge which is determined. In another example, grading of the electrode sheet may be associated with identifying an exact location of a defect in correspondence to the lane edge determined for the column on the electrode sheet, and the like. Depending on the grade of the electrode sheet, the application of the electrode sheet may be determined. For example, grade I electrode sheets may be used in automobiles and grade II electrode sheets may be used in Unlimited Power Supply (UPS) batteries.

Therefore, techniques of the present subject matter facilitate accurate detection of an edge of a lane on the electrode sheet, ensuring quality the electrode sheet, and in turn the battery in which the electrode sheet is utilized, is not compromised. Additionally, since techniques of the present subject matter consider the thickness of coating present in the uncoated region of the electrode sheet in quality assessment, the quality of the battery is not compromised. Furthermore, the accuracy of edge detection also helps in ascertaining whether the edges of the coated lanes on the upper surface area of the electrode sheet and the lower surface area of the electrode sheet exactly coincide with one another to meet the desired specification standards in manufacturing a battery, further enhancing the quality assurance of the battery.

The above and other features, aspects, and advantages of the subject matter have been further explained with regards to the following description and accompanying figures. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 illustrates an example electrode sheet 102, in accordance with an example implementation of the present subject matter. The electrode sheet 102 may be utilized as an anode or a cathode in a battery. A slurry mixture of an electrode material, alternatively referred to as a coating material, is deposited on a metal sheet, or a metallic foil, and the like, to form the electrode sheet 102. In one example, a first region 104 of the electrode sheet 102 which is deposited with the coating material, may be referred to as a coated region 104 and a second region 106 of the electrode sheet 102 on which the coating material is not deposited may be referred to as an uncoated region 106. In one example, but not limited to, the coated region 104 and the uncoated region 106 may be formed in the form of alternate lanes on the electrode sheet 102. For example, an aluminum sheet may be the metal sheet which is coated with a slurry mixture of Lithium-ion phosphate, where the Lithium-ion phosphate may be coated in lanes to form the coated region and the aluminum sheet between the coated lanes of Lithium-ion phosphate forms the uncoated region on the electrode sheet. In one example, the coating material may be deposited on an upper surface 110 of the electrode sheet 102, as well as a lower surface 112 of the electrode sheet 102, such that the lanes of the coated region 104 and the uncoated region 106 on the upper surface 110 of the electrode sheet 102 coincide with the lanes of the coated region 104 and uncoated region 106 on the lower surface 112 of the electrode sheet 102.

In one example, on receiving the electrode sheet 102, the electrode sheet 102 may be assessed to determine the quality of the electrode sheet 102. Assessing the quality of the electrode sheet 102 may be based on certain parameters, for example, such as edges detected between the coated region 104 and the uncoated region 106 of the electrode sheet 102, whether the edges determined between the coated regions 104 and the uncoated regions 106 on the upper surface 110 of the electrode sheet 102 coincide with the edges of the determined between the coated regions 104 and the uncoated regions 106 on the lower surface 112 of the electrode sheet 102, and the like. Assessing such parameters facilitate grading of the electrode sheet 102. Based on the grade of the electrode sheet 102, a suitable application for the electrode sheet 102 may be assessed.

In order to assess the electrode sheet 102, the electrode sheet 102 may be scanned from one corner to another. For example, scanners like nuclear scanners, hard X-ray machines, or other scanning mechanisms which may utilize ionizing radiation capable of microscopic scanning may be utilized to scan the electrode sheet 102 from one corner to another. The electrode sheet 102 may be scanned according to the scanning mechanism employed for scanning the electrode sheet 102, for example, but not limited to, the electrode sheet 102 may be scanned along a first direction X-Y, as represented in the figure. In another example, the electrode sheet 102 may be scanned in a direction substantially perpendicular to the first direction, and the like. For example, the scanning mechanism may include a scanning head mounted on a rack which may traverse in a direction substantially perpendicular to the direction in which the electrode sheet may move. In the current example, the scanning head may traverse along a direction substantially perpendicular to the direction X-Y of the electrode sheet.

Each point on the electrode sheet 102 may be scanned to record a scan data associated with the electrode sheet 102. For example, the scan data, amongst other information, may correspond to a coating thickness on the electrode sheet 102. Each point on the electrode sheet 102 for which a coating thickness is obtained may be referred to as a bin on the electrode sheet 102, where the bin corresponds to a resolution area scanned by the scanning mechanism while scanning the electrode sheet 102. In this manner, while scanning the electrode sheet 102 from one corner to another corner, the scan data for multiple bins 118-1, 118-2, 118-3 . . . 118-n, collectively and alternatively referred to as plurality of bins 118, multiple bins 118, or bins 118, may be collected and recorded.

To analyse the scan data obtained, and in turn assess the electrode sheet 102, in one example, multiple bins 118 of the electrode sheet 102 may be virtually distributed into a number of rows $r_1, r_2, r_3, \ldots, r_i, \ldots r_r$ and a number of columns $c_1, c_2, c_3, \ldots, c_n, \ldots c_c$ across an area 'A' of the electrode sheet 102. In one example, the number of rows $r_1, r_2, r_3, \ldots, r_i, \ldots r_r$, alternatively and collectively referred to as rows 'r', may be formed along a length 120 of the electrode sheet 102 and the number of columns $c_1, c_2, c_3, \ldots, c_n, \ldots c_c$, alternatively and collectively referred to as columns '$c_n$', may be formed along a width 122 of the electrode sheet 102. In another example, the number of rows 'r' may be formed along the width 122 of the electrode sheet 102 and the number of columns '$c_n$' may be formed along the length 120 of the electrode sheet 102. For the sake of understanding, the number of rows 'r' and the number of columns '$c_n$' have been represented as a uniform grid on the electrode sheet 102, with the number of rows 'r' considered along the length 120 of the electrode sheet 102 and the number of columns '$c_n$' considered along the width 122 of the electrode sheet 102. Although the following description has been explained with respect to the number of rows and columns virtually distributed in a uniform grid, similar principles may be applicable to other formations of the plurality of bins on the electrode sheet.

Accordingly, each bin amongst the multiple bins 118 may be referenced by a bin index $b_{in}$, where the bin index $b_{in}$ corresponds to a location of the bin on the electrode sheet 102. In one example, the bin index $b_{in}$ may represent the location of the bin corresponding to a row and a column on the electrode sheet 102, where 'i' may take an integer value which corresponds to a row number on the electrode sheet 102 and 'n' may take an integer value which corresponds to a column number on the electrode sheet 102. For example, a bin indexed as $b_{23}$ would represent a bin located at the intersection of second row and third column of the electrode sheet 102.

The following example is only to elucidate the bins distributed in rows and columns on the electrode sheet 102 and is not to be construed as a limitation. For example, an electrode sheet with dimensions of 8 cm length and 10 cm width may be considered. The area of the electrode sheet which includes coated and uncoated regions in alternating lanes would be 80 $cm^2$. If the resolution of the scanning mechanism is considered to be 1 $cm^2$, each bin formed on the electrode sheet would be 1 cm in width and 1 cm in length. Accordingly, 80 bins may be formed on the electrode sheet of 8×10 cm dimensions. These 80 bins on the electrode sheet would further be virtually distributed into a number of columns and rows. In this example, the 80 bins may be distributed into 10 columns formed along the width of the electrode sheet and 8 rows formed along the length of the electrode sheet, where each column of the electrode sheet would have 8 bins. In such an example, a bin with bin index $b_{45}$ would correspond to a bin positioned in the $4^{th}$ row of the $5^{th}$ column on the electrode sheet.

The scan data corresponding to the number of bins, coated region and uncoated region on the upper surface 110 and the lower surface 112 of the electrode sheet 102, the number of rows 'r', number of columns '$c_n$', and the like may be considered in to detect an edge of a lane which demarcates a transition from the coated region to the uncoated region of the electrode sheet 102 as explained with reference to FIG. 2.

Figure 2:
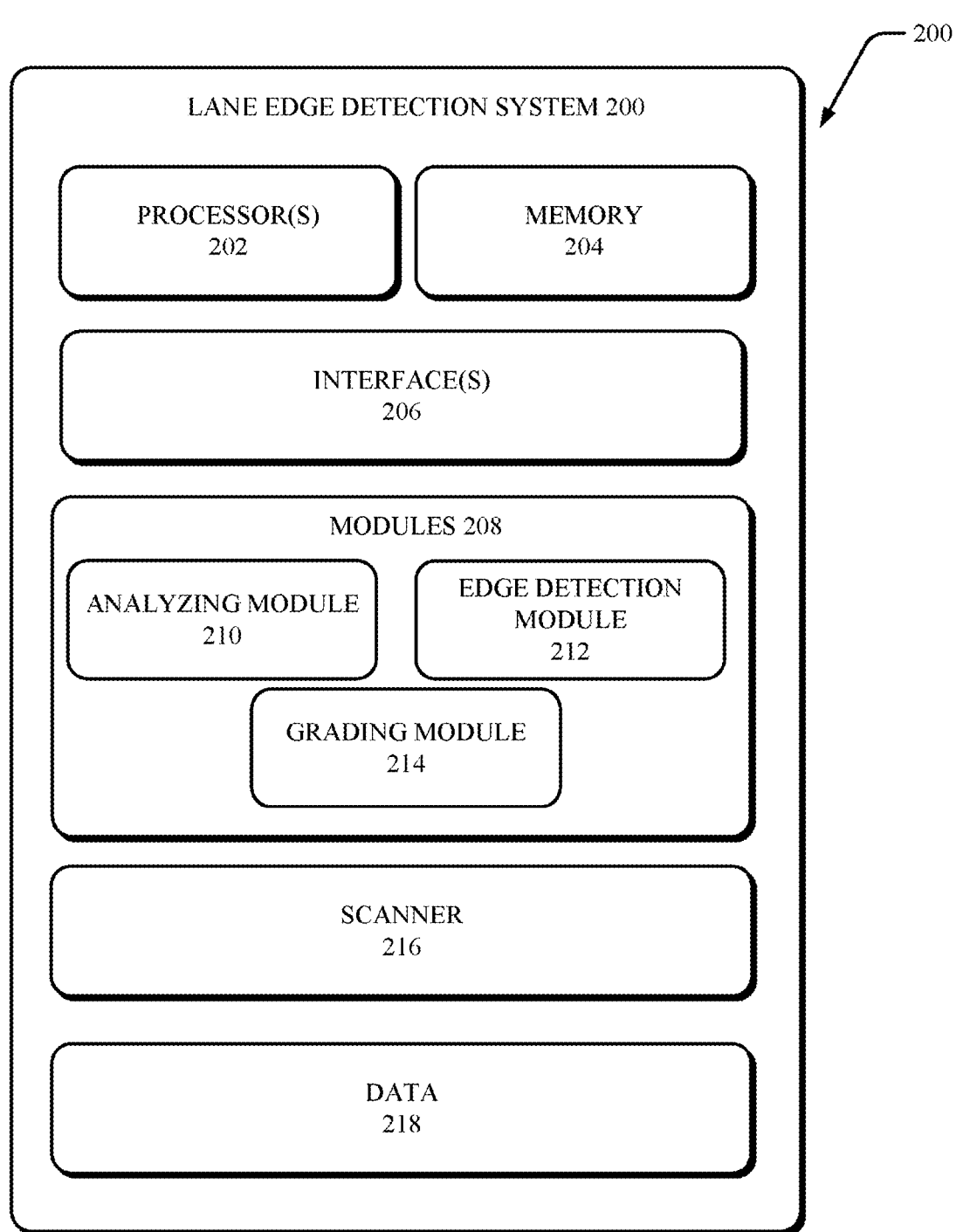
FIG. 2 illustrates a system for lane edge detection on an electrode sheet of a battery, in accordance with an example implementation of the present subject matter.

FIG. 2 illustrates a lane edge detection system 200 for lane edge detection on an electrode sheet of a battery, in accordance with an example implementation of the present subject matter. In one example, the lane edge detection system 200, alternatively referred to as system 200 for lane edge detection or system 200, may receive an electrode sheet with a coated and uncoated region, where the coated regions on the electrode sheet are formed by deposition of a coating material. On receiving the electrode sheet, the electrode sheet may be subjected to a scanning mechanism to obtain the scan data for lane edge detection. The system 200 may include a processor 202 and a memory 204 coupled to the processor 202.

The functions of functional block labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, standard and/or custom, may also be included. Further, an interface(s) 206 may allow the connection or coupling of the system 200 with one or more other devices (say devices or systems within the global supply chain network), through a wired (e.g., Local Area Network, i.e., LAN) connection or through a wireless connection (e.g., Bluetooth®, Wi-Fi). The interface(s) 206 may also enable intercommunication between different logical as well as hardware components of the system 200.

The memory 204 may include any computer-readable medium including, for example, volatile memory (e.g., RAM), and/or non-volatile memory (e.g., EPROM, flash memory, etc.).

The system 200 may further include modules 208, such as an analyzing module 210, an edge detection module 212, and a grading module 214. In one example, module(s) 208 may be implemented as a combination of hardware and firmware. In examples described herein, such combinations of hardware and firmware may be implemented in several different ways. For example, the firmware for the module may be processor executable instructions stored on a non-transitory machine-readable storage medium and the hardware for the module may include a processing resource (for example, implemented as either a single processor or a combination of multiple processors), to execute such instructions.

In the present examples, the machine-readable storage medium may store instructions that, when executed by the processing resource, implement the functionalities of the modules 208. In such examples, the lane edge detection system 200 may include the machine-readable storage medium storing the instructions and the processing resource to execute the instructions. For example, the processor 202 of the system 200 may cause a scanner 216 to receive an electrode sheet and subsequently, scan the electrode sheet. In other examples of the present subject matter, the machine-readable storage medium may be located at a different location but accessible to the lane edge detection system 200 and the processor 202.

The lane edge detection system 200 may further include data 218, that serves, amongst other things, as a repository for storing data that may be fetched, processed, received, or generated by the modules 208. The data 218 may include computational data, scan data of the electrode sheet 102, standard deviation values, target values, a range of specified limits for grading the electrode sheet 102, and the like. In an example, the data 218 may be stored in the memory 204.

Figure 3:
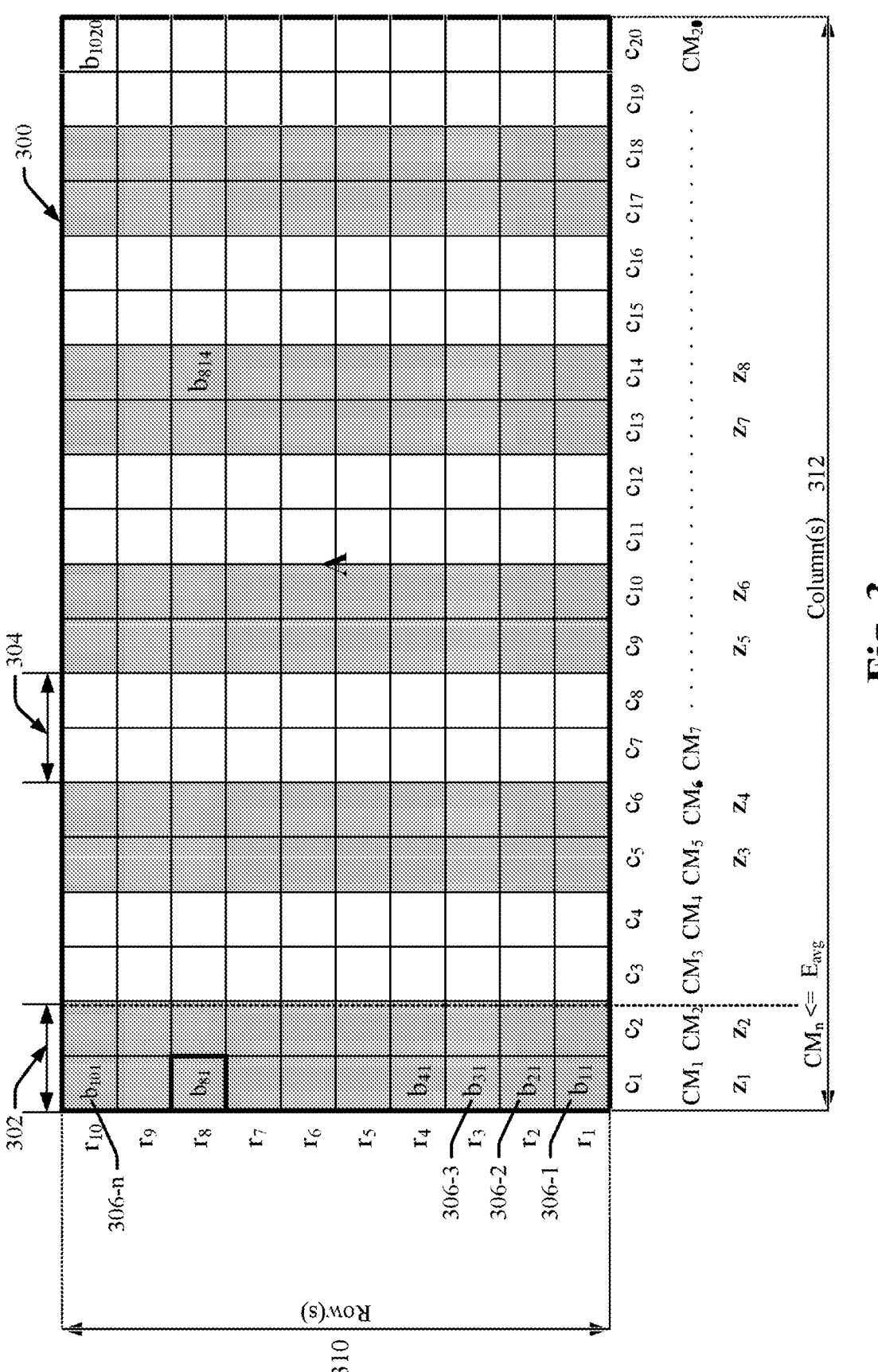
FIG. 3 illustrates another example of the electrode sheet, in accordance with an example implementation of the present subject matter.

In one example, the system 200 may receive an electrode sheet for scanning, and the processor 202 of the system 200 may cause the scanner 216 to scan the electrode sheet; for example, an electrode sheet 300 described with reference to FIG. 3. FIG. 3 illustrates an example electrode sheet 300, in accordance with the present subject matter. The electrode sheet 300 includes a coated region 302 and an uncoated region 304. The coated region 302 and the uncoated region 304 may be formed in the form of alternate lanes on the electrode sheet 300, where the coated region 302 includes a deposition of a coating material. Accordingly, the scanner 216 may scan the electrode sheet 300 to record a scan data associated with the electrode sheet 300. In one example, the scan data corresponds to, amongst other information, a coating thickness of the electrode sheet 300. In another example, the system 200 may obtain scan data from another scanner which may not be operatively coupled to the system 200. In one example, the scan data may be extracted from the data 218 of the system 200.

In one example, each point on the electrode sheet 300 may be referred to as a bin on the electrode sheet 300, where the bin corresponds to a resolution area scanned by the scanner 216 while scanning the electrode sheet 300. Accordingly, the scan data for multiple bins 306-1, 306-2, 306-3, . . . , 306-$n$, collectively and alternatively referred to multiple bins 306, or bin 306, may be recorded. In one example, multiple bins 306 of the electrode sheet 300 may be virtually distributed into a number of rows $r_1, r_2, r_3, \ldots, r_i, \ldots r_r$ and a number of columns $c_1, c_2, c_3, \ldots, c_n, \ldots c_c$ across an area 'A' of the electrode sheet 300. In one example, the number of rows $r_1, r_2, r_3, \ldots, r_i, \ldots r_r$, alternatively and collectively referred to as rows 'r', may be formed along a length 310 of the electrode sheet 102 and the number of columns $c_1, c_2, c_3, \ldots, c_n, \ldots c_c$, alternatively and collectively referred to as columns '$c_n$', may be formed along a width 312 of the electrode sheet 300. Further, each bin amongst the multiple bins 306 may be referenced by a bin index $b_{in}$, where the bin index $b_{in}$ corresponds to a location of the bin on the electrode sheet 300. In the example depicted in FIG. 3, multiple bins are distributed in 20 columns across the width 312 of the electrode sheet 300 and 10 rows across the length 310 of the electrode sheet 300.

It will be understood that the bins, coated regions, and uncoated regions shown in the figures are merely examples, and the actual dimensions would depend on the relative dimensions of the electrode sheets to be scanned by different scanning mechanisms.

In an example implementation of the present subject matter, the analyzing module 210 of the lane edge detection system 200 may obtain the scan data of the electrode sheet 300 to compute a first average coating thickness '$CM_n$' for each column of the electrode sheet 300. The first average coating thickness '$CM_n$' for each column of the electrode sheet 300 is computed based on a number of bins $b_{in}$ identified in each column '$c_n$' of the electrode sheet 300. In one example, the first average coating thickness '$CM_n$' for each column may be stored in the data 218 of the system 200. In one example, computation of the first average coating thickness '$CM_n$' may be performed using equation (1) as shown below:

$$\text{Column Average } (CM_n) = \frac{\sum_{i=0}^{i=r} b(in)}{r} \tag{1}$$

where,
'$CM_n$' represents the first average coating thickness for each column of the electrode sheet;
'r' represents the number of rows across the electrode sheet;
'$b_{in}$' represents the number of bins in a column of the electrode sheet;

For example, considering the electrode sheet 300 as depicted in FIG. 3, the first average coating thickness '$CM_n$' is calculated for each column of the electrode sheet 300, i.e., the first average coating thickness $CM_1, CM_2, CM_3, \ldots$, $CM_{20}$ is calculated for each of the 20 columns on the electrode sheet 300, where in each column '$c_n$' of the electrode sheet 300, there are 10 bins, for example, in column '$c_1$', the ten bins for which the first average coating thickness $CM_1$ is calculate would include bins $b_{11}, b_{21}$, $b_{31}, \ldots$, and $b_{101}$.

On computing the first average coating thickness '$CM_n$' for each column of the electrode sheet 300, the columns '$c_n$' of the electrode sheet 300 may be sorted corresponding to the first average coating thickness '$CM_n$' computed for each column. In operation, the columns '$c_n$' may be sorted in an ascending order of first average coating thickness '$CM_n$', a descending order of the first average coating thickness '$CM_n$', or any other sorting technique may be employed to sort the columns based on the first average coating thickness '$CM_n$'. Further, a first set of columns 'z' may be selected from the sorted first average coating thickness '$CM_n$' for each column.

In one example, it may be assumed that the first set of columns 'z' may be accurately coated. For example, but not limited to, a top 40 percent of the columns may be selected, where the top 40 percent of the columns are assumed to be coated accurately. In another example, a top 55 percent or top 60 percent of the columns may be selected, and the like. Considering the example of the electrode sheet 300, all the columns would be sorted based on a value of the first average coating thickness '$CM_n$', for example, if the 20 columns of the electrode sheet 300 are sorted in a descending order of the first average coating thickness '$CM_n$' computed, a top 40% of the columns of the electrode sheet 300 may be considered as the first set of columns 'z', which are assumed to be accurately coated. So, it would be assumed that 8 columns $z_1$, $z_2$, $z_3$, $z_4$, $z_5$, $z_6$, $z_7$, and $z_8$, of the total number of 20 columns $c_1$, $c_2$, $c_3$, . . . , $c_{20}$, have been accurately coated.

On selecting the first set of columns 'z', a second average coating thickness 'μ' for the first set of columns 'z' of the electrode sheet is calculated. In one example, the second average coating thickness 'μ' is computed based on the first average coating thickness '$CM_n$' computed for each column of the electrode sheet. In one example, the second average coating thickness 'μ' may be computed using equation (2) as shown below:

$$\mu = \frac{\sum_{i=0}^{i=z} CMn}{z} \qquad (2)$$

where,

'μ' is the second average coating thickness for the first set of columns;

'z' represents the top 40 percent of the first average coating thickness for each column;

'$CM_n$' represents the first average coating thickness for each column.

On calculating the second average coating thickness 'μ' for the first set of columns 'z' of the electrode sheet, a difference between the second average coating thickness 'μ' for the first set of columns 'z' and a standard deviation value σ is identified to compute an average minimum edge coating thickness '$E_{avg}$'.

In one example, the standard deviation value 'σ' may be computed from a set target value 'T', where the set target value 'T' may be provided by a user. In another example, the analyzing module 210 may determine the standard deviation value 'σ'. When the set target value 'T' is provided by the user, the standard deviation value σ may be computed using equation (3) represented below:

$$\sigma = |\mu - T| \qquad (3)$$

Where,

'σ' is the standard deviation value; and

'T' is the set target value;

Considering the example of the electrode sheet 300 as depicted in FIG. 3, if the second average coating thickness 'μ' for the first set of columns 'z' of the electrode sheet 300 is calculated to be 10.1 micrometers (μm), and the set target value 'T' provided by the user is 10 μm, then the standard deviation value 'σ' would be calculated as 0.1 μm.

Further, in another example, the analyzing module 210 of the system 200 may determine the standard deviation value 'σ' based on the second average coating thickness 'μ' for the first set of columns, number of rows 'r', number of bins ($b_{in}$), and the first set of columns 'z' using equation (4) represented below:

$$\sigma = \sqrt{\frac{\sum_{i=0}^{i=r}\left(\sum_{n=0}^{n=z}(b(in) - \mu)^2\right)}{z * r}} \qquad (4)$$

Where,

'σ' is the standard deviation value;

'μ' is the second average coating thickness for the first set of columns;

'z' represents the top 40 percent of the first average coating thickness for each column;

'r' represents the number of bins across a length of the electrode sheet;

'b(in)' represents the bin value at the '$i$'$^{th}$ row and '$n$'$^{th}$ column;

On determining the standard deviation value 'σ', an average minimum edge coating thickness '$E_{avg}$' is computed. In one example, the average minimum edge coating thickness '$E_{avg}$' may be computed using equation (5) represented below:

$$E_{avg} = (\mu - k\sigma) \qquad (5)$$

Where,

'$E_{avg}$' represents the average minimum edge coating thickness;

'k' is an arbitrary value;

'σ' is the standard deviation value; and

'μ' is the second average coating thickness for the first set of columns;

In one example, the arbitrary value of 'k' may be set to a default value. The arbitrary value 'k' may be utilized to determine a specified range to assess the grade of the electrode sheet. For example, the arbitrary value may be equal to an integer value, such as 3, 2, or the like. In another example, the arbitrary value may be chosen by a user from a set of pre-defined values. In yet another example, the arbitrary value may be provided by the user. For example, considering the example as described above, where the second average coating thickness 'μ' for the first set of columns 'z' of the electrode sheet 300 is calculated to be 10.1 μm, the set target value 'T' provided by the user is 10 μm, the standard deviation value 'σ' calculated based on the set target value 'T' provided by the user is 0.1 μm, and the arbitrary value 'k' is 1, then the average minimum edge coating thickness '$E_{avg}$' would be 10 μm.

Further, the average minimum edge coating thickness '$E_{avg}$' may be compared with the first average coating thickness '$CM_n$' computed for each column of the electrode sheet to detect an edge transition of the coated region to the uncoated region, or vice-versa, of the electrode sheet. In one example, the edge detection module 212 of the system 200 may detect the edge transition of the coated region to the uncoated region on the electrode sheet using equation (6) as shown below:

$$CM_n \leq E_{avg} \qquad (6)$$

Where,

'$E_{avg}$' represents the average minimum edge coating thickness; and

'$CM_n$' represents the first average coating thickness for each column;

Therefore, when the first average coating thickness '$CM_n$' for each column is less than or equal to the average minimum edge coating thickness, an edge transition of the coated region to the uncoated region of the electrode sheet may be detected, or vice versa. Corresponding to the detected edge transition of the coated region to the uncoated region, or vice versa, a lane edge '$C_n$' for the column of the electrode sheet may be determined. In one example, the lane edge '$C_n$' for the columns $c_1$, $c_2$, . . . , $c_n$ of the electrode sheet may be determined corresponding to the detection of the edge transition of the coated region to the uncoated region of the electrode sheet. For example, the lane edge '$C_n$' may be determined at a point at which the edge transition of the coated region to the uncoated region is detected.

On continuing the same example as above with respect to the electrode sheet 300, in a scenario where, for example, the first average coating thickness for each column '$CM_n$' may be considered as follows, where '$CM_1$' is equal to 10.1 µm, '$CM_2$' is equal to 9.9 µm, '$CM_3$' is equal to 10.2 µm, and the like. The value of '$CM_n$' is compared with the '$E_{avg}$' value, which is assumed to be 10 µm. When the first average coating thickness '$CM_n$' for each column is less than or equal to the average minimum edge coating thickness '$E_{avg}$', an edge transition of the coated region to the uncoated region of the electrode sheet 300 is detected. From the first average coating thickness '$CM_n$' for each column considered above, for the second column $c_2$, it may be observed that the first average coating thickness $CM_2$ is 9.9 µm, which is less than the average minimum edge coating thickness '$E_{avg}$' value, where '$E_{avg}$' is equal to 10 µm. Therefore, an edge transition of the coated region to the uncoated region may be detected at $c_2$. In one example, the lane edge '$C_n$' may be determined at column $c_n$ at which an edge transition from the coated region to the uncoated region is detected. For example, $C_2$ may be determined to be a lane edge on the electrode sheet 300. Similarly, multiple lane edges '$C_n$' may be determined on the electrode sheet 300.

Further, the lane edges '$C_n$' determined may be further translated into a physical width of the column '$c_n$' on the electrode sheet. In one example, the detected edge at a location 'i' may be translated into a physical width onto the electrode sheet using equation (7) as shown below:

$$Physical\ Width = (i * BW)$$ (7)

where,
'BW' represents the width of a bin, which is equal to a width of the column '$c_n$';
'i' is a location at which the lane edge '$C_n$' is determined;
Further, on determining the lane edges '$C_n$' on the electrode sheet, the grading module 214 of the system 200 may determine a grade of the electrode sheet 300. The grade of the electrode sheet may be assessed to ascertain a quality of the electrode sheet which would in turn indicate a quality of the battery. In one example, the electrode sheet may be graded as acceptable or unacceptable. In one example, the electrode sheet may be graded as acceptable when the average minimum edge coating thickness of the column lies within a specified limit. In one example, the specified limit may be provided by a user, where the user may provide a reject low value and a reject high value. When the average minimum edge coating thickness lies between the reject low value and the reject high value, the electrode sheet may be graded as acceptable. Further, an electrode sheet graded as acceptable may be further graded as grade I electrode sheet and grade II electrode sheet. Depending on the grade of the electrode sheet, the application of the electrode sheet may be determined. For example, grade I electrode sheets may be used in automobiles and grade II electrode sheets may be used in Unlimited Power Supply (UPS) batteries.

In one example, the electrode sheet which is graded as acceptable may be further graded as grade I electrode sheet and grade II electrode sheet. Additionally, the grade of the electrode sheet may also be assessed based on certain other parameters, such as an amount of coating material present beyond the determined lane edge may be checked for, i.e., the amount of coating material present in the uncoated region of the electrode sheet 300 may be checked for. If the amount of coating material in the uncoated region of the electrode sheet 300 lies within a specified range, the electrode sheet 300 may be graded as acceptable.

In another example, it may be checked if the lane edges determined on an upper surface of the electrode sheet coincide exactly with the lower surface of the electrode sheet, based on which a grade of the electrode sheet may be assessed.

Therefore, as techniques of the present subject matter facilitate in accurate determination of lane edges of the coated and uncoated regions on the electrode sheet, the quality of the battery is uncompromised.

Figure 4:
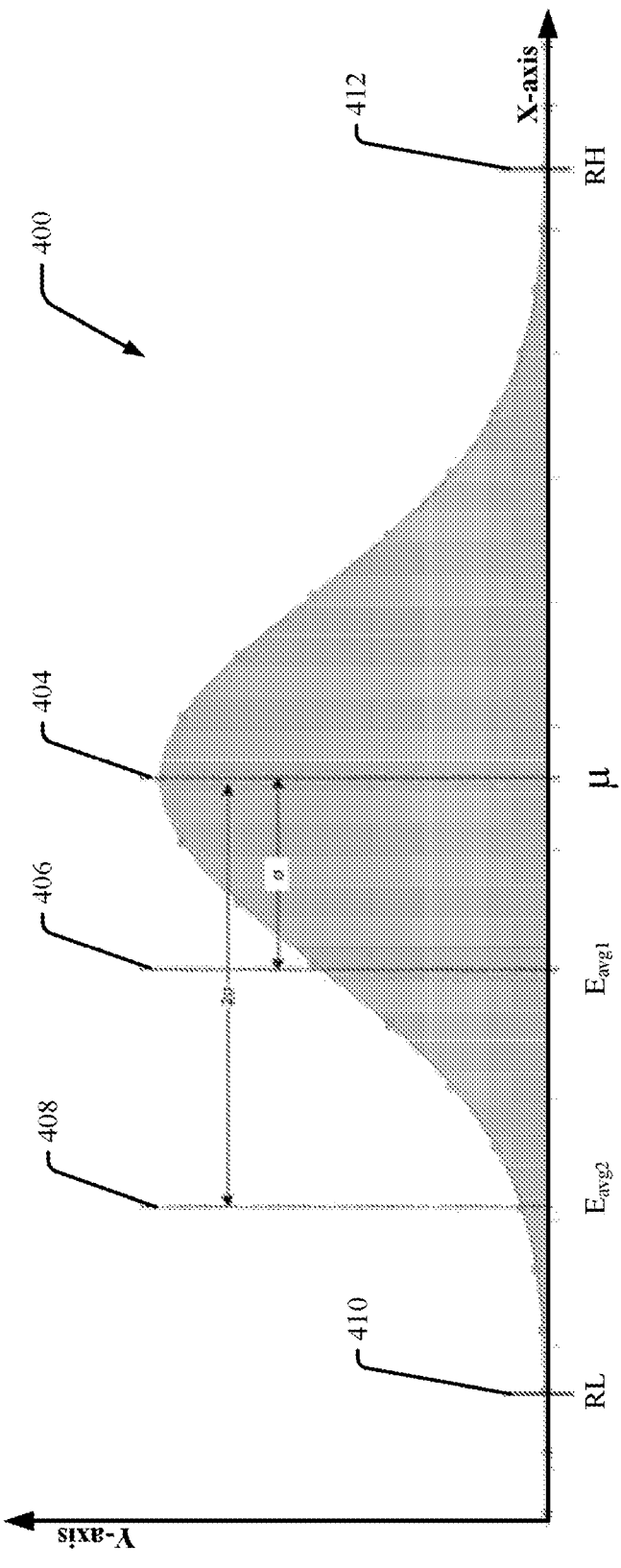
FIG. 4 illustrates a graph depicting a distribution curve of the second average coating thickness, in accordance with an example implementation of the present subject matter.

FIG. 4 illustrates a graph 400 depicting a distribution curve of the second average coating thickness, in accordance with an example implementation of the present subject matter. FIG. 4 depicts a graph 400 derived from normalizing the second average coating thickness 'µ' for the first set of columns, where the second average coating thickness 'µ' for the first set of columns is plotted along the x-axis and a number of columns with the corresponding value of second average coating thickness 'µ' is plotted along the y-axis. On receiving an electrode sheet, such as the electrode sheet 300, the electrode sheet 300 is scanned to obtain scan data corresponding to the coating thickness of multiple bins on the electrode sheet 300. To detect an edge transition from the coated region to an uncoated region of the electrode sheet, a first average coating thickness for each column of the electrode is computed. On computing the first average coating thickness for each column, a second average coating thickness for a first set of columns of the electrode sheet is calculated.

The computational steps to compute the values of the first average coating thickness for each column, a second average coating thickness for a first set of columns, the standard deviation, and the average minimum edge coating thickness may be the same as described with reference to FIG. 2 and have not been repeated here for the sake of brevity. The second average coating thickness for a first set of columns µ is depicted by the line 404 on the graph 400.

Based on a difference between the second average coating thickness for the first set of columns 'µ' and the standard deviation value 'σ', an average minimum edge coating thickness '$E_{avg}$'. Depending on the arbitrary value k chosen in equation (5), as discussed above with reference to FIG. 2, the '$E_{avg}$' value may be depicted. In one example, when the arbitrary value 'k' is chosen as '1', $E_{avg}(\mu-\sigma)$ may be depicted by line 406. In another example, when the arbitrary value k is chosen as 2, $E_{avg}(\mu-2\sigma)$ may be depicted by line 408.

In one example, the user may provide a set target value 'T', a reject high value 'RH', and a reject low value 'RL'. In one example, to assess the quality of the electrode sheet and to ascertain if the electrode sheet is acceptable, it may be determined if the computed average minimum edge coating thickness '$E_{avg}$' lies within a specified limit, i.e., within reject low value 'RL' and the reject high value 'RH'. Any value which may lie between the reject low value 'RL' and the reject high value 'RH' may be considered as acceptable.

The following example is intended to illustrate an example scenario of quality assessment of the electrode sheet once the lane edge '$C_n$' is determined in accordance with the principles of the present subject matter, and not intended to be taken restrictively to imply any limitations on the scope of the present disclosure.

In one example, the user may provide specifications where for a given electrode sheet, the user would require the average minimum edge coating thickness '$E_{avg}$' to be 5 μm. This specification provided by the user may be considered as the set target value 'T'. Further, the user may indicate that any values above 4.9 μm and below 5.2 μm would be acceptable, where 4.9 μm would be the reject low value 'RL' 410 and 5.2 μm would be the reject high value 'RH' 412. In one example, on receiving the electrode sheet 300, the average minimum edge coating thickness '$E_{avg}$' may be determined as described with reference to FIG. 2. To assess the quality of the electrode sheet and to ascertain if the electrode sheet is acceptable, it may be determined if the computed average minimum edge coating thickness '$E_{avg}$' lies within a specified limit, i.e., within the reject low value 'RL' 410 and the reject high value 'RH' 412. In this example, considering the computed value of average minimum edge coating thickness '$E_{avg}$' is 5.1 μm, the electrode sheet 300 would be graded as grade I since the computed value of average minimum edge coating thickness '$E_{avg}$' lies within the reject low value 'RL' and the reject high value 'RH' of 4.9 μm and 5.2 μm, respectively. However, in a case where the computed value of the average minimum edge coating thickness '$E_{avg}$' falls below the reject low value 'RL' 410 and above the reject high value 'RH' of 412 the electrode sheet may be graded as grade II or unacceptable. Therefore, accurate detection of lane edges based on the computed average minimum edge coating thickness '$E_{avg}$' in accordance with the present subject matter enables enhanced quality assessment checks.

FIG. 5 illustrates an example method 500 for lane edge detection on an electrode sheet of a battery, in accordance with an example implementation of the present subject matter. The order in which the method 500 is described is not intended to be construed as a limitation, and any number of the described method blocks can be combined in any order to implement method 500 or an alternative method. Additionally, individual blocks may be deleted from the method 500 without departing from the spirit and scope of the subject matter described herein. Furthermore, the method 500 may be implemented in any suitable hardware, computer readable instructions, firmware, or combination thereof. For discussion, the method 500 is described with reference to the implementations illustrated in FIGS. 1-4.

At block 502, the method 500 includes receiving an electrode sheet which includes a coated region and an uncoated region. In one example, the coated region and the uncoated region may be formed in the form of alternate lanes on the electrode sheet, where the coated region includes a deposition of a coating material.

At block 504, the method 500 includes obtaining a scan data associated with the electrode sheet, wherein the scan data corresponds to a coating thickness of a plurality of bins on the electrode sheet, wherein the plurality of bins are distributed into a number of rows and a number of columns across an area of the electrode sheet.

At block 506, the method 500 includes computing a first average coating thickness for each column of the electrode sheet based on a number of bins identified in the column of the electrode sheet. In one example, the first average coating thickness for each column of the electrode sheet may be sorted corresponding to a thickness of the coating. In one example, it may be assumed that the first set of columns 'z' may be accurately coated. For example, but not limited to, a top 40 percent of the columns may be selected, where the top 40 percent of the columns are assumed to be coated accurately. Further, the first set of columns may be selected to compute a second average coating thickness.

At block 508, the method 500 includes calculating a second average coating thickness for a first set of columns of the electrode sheet based on the first average coating thickness computed for each column.

At block 510, the method 500 includes identifying a difference between the second average coating thickness for the first set of columns and a standard deviation value to compute an average minimum edge coating thickness. In one example, the standard deviation value may be computed as a difference between the second average coating thickness for the first set of columns and a set target value.

At block 512, the method 500 includes comparing the average minimum edge coating thickness with the first average coating thickness for each column to detect an edge transition of the coated region to the uncoated region of the electrode sheet. In one example, when the average minimum edge coating thickness is greater than or equal to the first average coating thickness for each column, the edge transition is detected. In one example, the edge transition may be detected from a coated region to an uncoated region.

At block 514, the method 500 includes determining a lane edge for the column of the electrode sheet corresponding to the detection of the edge transition of the coated region to the uncoated region of the electrode sheet. In one example, the lane edge for the column of the electrode sheet determined may be translated into a physical width of the column on the electrode sheet, where translating the lane edge determined, includes identifying a location of the edge transition detected on the electrode sheet and associating the location of the edge transition with a width of a bin corresponding to the location.

FIG. 6 illustrates another example method 600 for lane edge detection on an electrode sheet of a battery, in accordance with an example implementation of the present subject matter. The order in which the method 600 is described is not intended to be construed as a limitation, and any number of the described method blocks can be combined in any order to implement method 600 or an alternative method. Additionally, individual blocks may be deleted from the method 600 without departing from the spirit and scope of the subject matter described herein. Furthermore, the method 600 may be implemented in any suitable hardware, computer readable instructions, firmware, or combination thereof. For discussion, the method 600 is described with reference to the implementations illustrated in FIGS. 1-4.

At block 602, the method 600 includes computing a first average coating thickness for each column of the electrode sheet based on scan data associated with the electrode sheet.

At block 604, the method 600 includes calculating the second average coating thickness for a first set of columns of the electrode sheet based on the first average coating thickness computed for each column. In one example, it may be assumed that the first set of columns 'z' may be accurately coated. For example, but not limited to, a top 40 percent of the columns may be selected, where the top 40 percent of the columns are assumed to be coated accurately. In another example, a top 55 percent or top 60 percent of the columns may be selected, and the like.

At block 606, the method 600 includes checking if a user has provided a set target value. In one example, where the user has provided with the set target value, the method 600 at block 608 includes determining the standard deviation value based on the set target value as described above with reference to equation (3). In another example, where the set target value is not provided by the user, the method 600 at block 610 includes determining the standard deviation value based on the first set of columns as described above with reference to equation (4).

At block 612, the method 600 includes identifying a difference between the second average coating thickness for the first set of columns and the standard deviation value to compute an average minimum edge coating thickness.

At block 614, the method 600 includes comparing the average minimum edge coating thickness with the first average coating thickness for each column to detect an edge transition of the coated region to the uncoated region of the electrode sheet, or an edge transition of the uncoated region to the coated region of the electrode sheet. In one example, when the first average coating thickness $CM_n$ for each column is less than or equal to the average minimum edge coating thickness, an edge transition of the coated region to the uncoated region, or vice versa, of the electrode sheet may be detected.

At block 616, the method 600 includes determining a lane edge for the column of the electrode sheet corresponding to the detection of the edge transition of the coated region to the uncoated region of the electrode sheet or edge transition of the uncoated region to the coated region of the electrode sheet. For example, the lane edge '$C_n$' may be determined at a point at which the edge transition of the coated region to the uncoated region, or vice versa, is detected.

At block 618, the method 600 includes grading the electrode sheet based on the lane edge determined for the column of the electrode sheet. In one example, the grade of the electrode sheet may be assessed to ascertain a quality of the electrode sheet which would in turn indicate a quality of the battery. In one example, the electrode sheet may be graded as acceptable when the average minimum edge coating thickness of the column lies within a specified limit. In one example, the specified limit may be provided by a user, where the user may provide a reject low value and a reject high value. When the average minimum edge coating thickness lies between the reject low value and the reject high value, the electrode sheet may be graded as acceptable.

In one example, the electrode sheet which is graded as acceptable may be further graded as grade I electrode sheet and grade II electrode sheet. Depending on the grade of the electrode sheet, the application of the electrode sheet may be determined.

Figure 7:
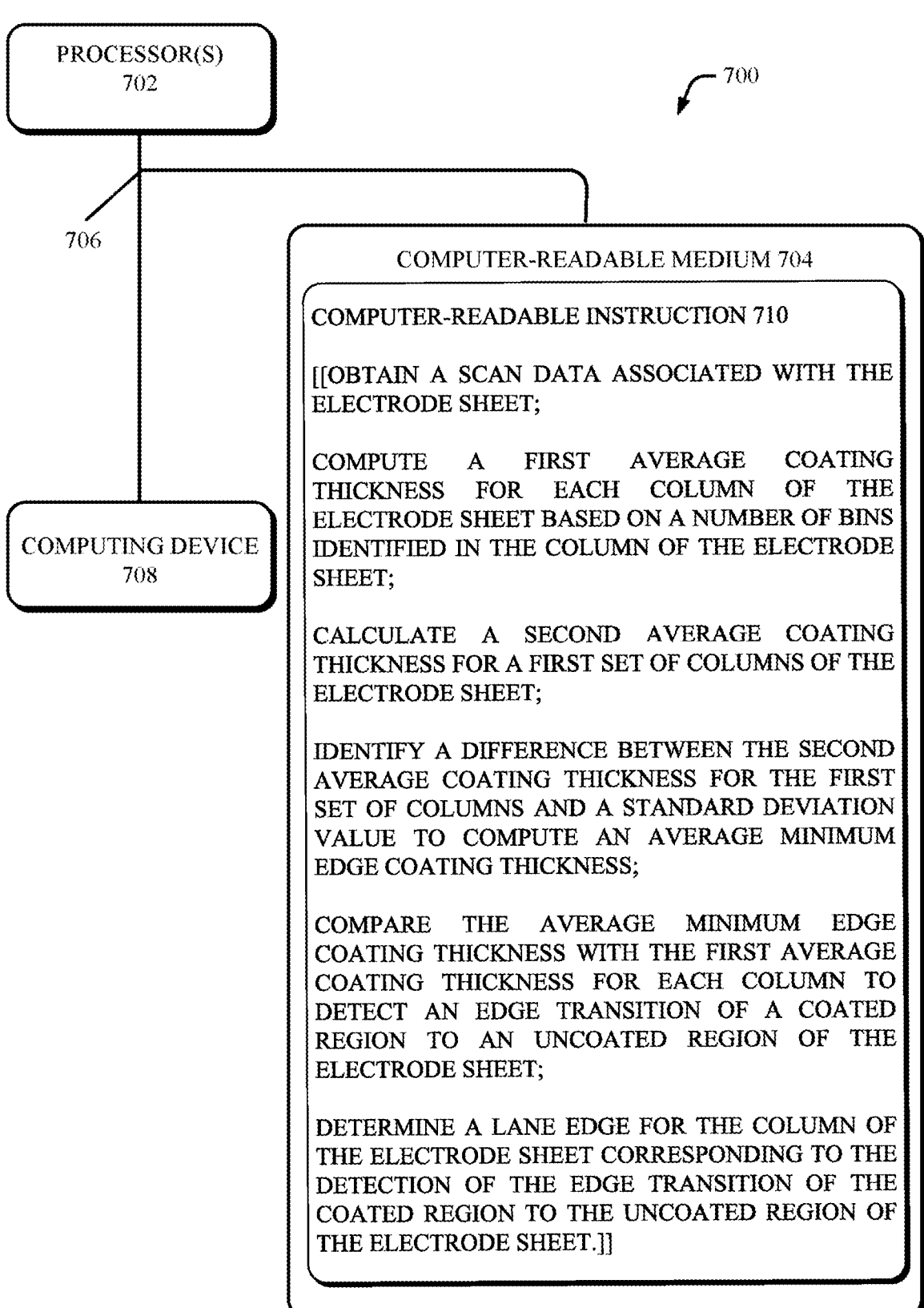
FIG. 7 illustrates a non-transitory computer-readable medium for lane edge detection on an electrode sheet of a battery, in accordance with an example implementation of the present subject matter.

FIG. 7 illustrates a non-transitory computer-readable medium for lane edge detection on an electrode sheet of a battery, in accordance with an example of the present subject matter. In an example, the computing environment 700 includes processor 702 communicatively coupled to a non-transitory computer readable medium 704 through communication link 706. In an example implementation, the computing environment 700 may be for example, the lane edge detection system 200. In an example, the processor 702 may have one or more processing resources for fetching and executing computer-readable instructions from the non-transitory computer readable medium 704. The processor 702 and the non-transitory computer readable medium 704 may be implemented, for example, in the lane edge detection system 200.

The non-transitory computer readable medium 704 may be, for example, an internal memory device or an external memory. In an example implementation, the communication link 706 may be a network communication link, or other communication links, such as a PCI (Peripheral component interconnect) Express, USB-C (Universal Serial Bus Type-C) interfaces, I2C (Inter-Integrated Circuit) interfaces, and the like. In an example implementation, the non-transitory computer readable medium 704 includes a set of computer readable instructions 710 which may be accessed by the processor 702 through the communication link 706 and subsequently executed for lane edge detection on an electrode sheet of a battery. The processor(s) 702 and the non-transitory computer readable medium 704 may also be communicatively coupled to a computing device 708 over the network.

Referring to FIG. 7, in an example, the non-transitory computer readable medium 704 includes computer readable instructions 710 that cause the processor 702 to obtain a scan data associated with the electrode sheet, where the scan data corresponds to coating thickness of a plurality of bins on the electrode sheet, where each bin from amongst the plurality of bins corresponds to a resolution area scanned, and where the plurality of bins are distributed into a number of rows and a number of columns across an area of the electrode sheet.

The instructions 710 may further cause the processor 702 to compute a first average coating thickness for each column of the electrode sheet based on a number of bins identified in the column of the electrode sheet.

Further, the instructions 710 may cause the processor 702 to calculate a second average coating thickness for a first set of columns of the electrode sheet, where the first set of columns of the electrode sheet are selected based on the first average coating thickness computed for each column.

The instructions 710 may further cause the processor 702 to identify a difference between the second average coating thickness for the first set of columns and a standard deviation value to compute an average minimum edge coating thickness.

The instructions 710 may further cause the processor 702 to compare the average minimum edge coating thickness with the first average coating thickness for each column to detect an edge transition of a coated region to an uncoated region of the electrode sheet, where the coated region and the uncoated region are formed in form of alternate lanes on the electrode sheet, and determine a lane edge for the column of the electrode sheet corresponding to the detection of the edge transition of the coated region to the uncoated region of the electrode sheet.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method for lane edge detection on an electrode sheet of a battery, the method comprising:

receiving the electrode sheet which includes a coated region and an uncoated region, wherein the coated region and the uncoated region are formed in form of alternate lanes on the electrode sheet, wherein the coated region comprises a deposition of a coating material;

obtaining a scan data associated with the electrode sheet, wherein the scan data corresponds to a coating thickness of a plurality of bins on the electrode sheet, wherein each bin from amongst the plurality of bins corresponds to a resolution area scanned by a scanning mechanism while scanning the electrode sheet, and wherein the plurality of bins are distributed into a number of rows and a number of columns across an area of the electrode sheet;

computing a first average coating thickness for each column of the electrode sheet based on a number of bins identified in the column of the electrode sheet;

calculating a second average coating thickness for a first set of columns of the electrode sheet based on the first average coating thickness computed for each column;

identifying a difference between the second average coating thickness for the first set of columns and a standard deviation value to compute an average minimum edge coating thickness;

comparing the average minimum edge coating thickness with the first average coating thickness for each column to detect an edge transition of the coated region to the uncoated region of the electrode sheet; and determining a lane edge for the column of the electrode sheet corresponding to the edge transition of the coated region to the uncoated region of the electrode sheet.

2. The method of claim 1 further comprising determining a grade of the electrode sheet corresponding to the lane edge for the column to assess a quality of the electrode sheet.

3. The method of claim 2, wherein the electrode sheet is graded as acceptable when the lane edge of the column lies within a specified limit.

4. The method of claim 1 further comprising sorting the first average coating thickness for each column of the electrode sheet corresponding to a thickness of the coating to obtain a sorted first average coating thickness for each column.

5. The method of claim 4 further comprising selecting a first set of columns from the sorted first average coating thickness for each column.

6. The method of claim 1, wherein when the average minimum edge coating thickness is greater than or equal to the first average coating thickness for each column, the edge transition is detected.

7. The method of claim 1 further comprises translating the lane edge for the column of the electrode sheet into a physical width of the column on the electrode sheet.

8. The method of claim 7, wherein translating the lane edge for the column comprises identifying a location of the edge transition detected on the electrode sheet and associating the location of the edge transition with a width of a bin corresponding to the location.

9. The method of claim 1, wherein the standard deviation value is computed as a difference between the second average coating thickness for the first set of columns and a set target value.

10. The method of claim 1 further comprising obtaining a set target value from a user to compute the standard deviation value.

11. A system for lane edge detection on an electrode sheet of a battery, the system comprising:

a processor; and a machine-readable storage medium comprising instructions executable by the processor, wherein the processor causes:

a scanner to:

receive the electrode sheet which includes a coated region and an uncoated region, wherein the coated region and the uncoated region are formed in form of alternate lanes on the electrode sheet, wherein the coated region comprises a deposition of a coating material; and scan the electrode sheet to record a scan data associated with the electrode sheet, wherein the scan data corresponds to a coating thickness of a plurality of bins on the electrode sheet, wherein each bin from amongst the plurality of bins corresponds to a resolution area scanned by the scanner, and wherein the plurality of bins are distributed into a number of rows and a number of columns across an area of the electrode sheet;

an analyzing module to:

compute a first average coating thickness for each column of the electrode sheet based on a number of bins identified in the column of the electrode sheet;

calculate a second average coating thickness for a first set of columns of the electrode sheet based on the first average coating thickness computed for each column; and identify a difference between the second average coating thickness for the first set of columns and a standard deviation value to compute an average minimum edge coating thickness; and an edge detection module to:

compare the average minimum edge coating thickness with the first average coating thickness for each column to detect an edge transition of the coated region to the uncoated region of the electrode sheet; and determine a lane edge for the column of the electrode sheet corresponding to the edge transition of the coated region to the uncoated region of the electrode sheet.

12. The system of claim 11, further comprising a grading module to determine a grade of the electrode sheet corresponding to the lane edge for the column to assess a quality of the electrode sheet.

13. The system of claim 11, wherein the analyzing module is to sort the first average coating thickness for each column of the electrode sheet corresponding to a thickness of the coating to obtain a sorted first average coating thickness for each column.

14. The system of claim 13, wherein the analyzing module is to select a first set of columns from the sorted first average coating thickness for each column.

15. The system of claim 11, wherein when the average minimum edge coating thickness is greater than or equal to the first average coating thickness for each column, the edge transition is detected.

16. The system of claim 11, wherein the edge detection module is to translate the lane edge for the column of the electrode sheet into a physical width of the column on the electrode sheet.

17. The system of claim 11, wherein the standard deviation value is computed as a difference between the second average coating thickness for the first set of columns and a set target value.

18. The system of claim 11, wherein the electrode sheet is graded as acceptable when the lane edge of the column lies within a specified limit.

19. A non-transitory computer-readable medium comprising instructions for lane edge detection on an electrode sheet of a battery, the instructions being executable by a processor to:

obtain a scan data associated with the electrode sheet, wherein the scan data corresponds to coating thickness of a plurality of bins on the electrode sheet, wherein each bin from amongst the plurality of bins corresponds to a resolution area scanned, and wherein the plurality of bins are distributed into a number of rows and a number of columns across an area of the electrode sheet;

compute a first average coating thickness for each column of the electrode sheet based on a number of bins identified in the column of the electrode sheet;

calculate a second average coating thickness for a first set of columns of the electrode sheet, wherein the first set of columns of the electrode sheet are selected based on the first average coating thickness computed for each column;

identify a difference between the second average coating thickness for the first set of columns and a standard deviation value to compute an average minimum edge coating thickness;

compare the average minimum edge coating thickness with the first average coating thickness for each column to detect an edge transition of a coated region to an uncoated region of the electrode sheet, wherein the coated region and the uncoated region are formed in form of alternate lanes on the electrode sheet, wherein the coated region comprises a deposition of a coating material; and determine a lane edge for the column of the electrode sheet corresponding to the edge transition of the coated region to the uncoated region of the electrode sheet.

20. The non-transitory computer-readable medium as claimed in claim 19, wherein when the average minimum edge coating thickness is greater than or equal to the first average coating thickness for each column, the edge transition is detected.

\* \* \* \* \*